United States Patent
Vade et al.

(10) Patent No.: US 10,896,224 B2
(45) Date of Patent: Jan. 19, 2021

(54) SYSTEM AND METHOD FOR DETERMINING AND DISPLAYING A LIST OF SUGGESTED SEARCH ITEMS FOR A SEARCH FIELD BASED ON PRIOR USER INTERACTION

(71) Applicant: ORACLE INTERNATIONAL CORPORATION, Redwood Shores, CA (US)

(72) Inventors: Arjun Vade, Bengaluru (IN); Ashwin Prabhu, Bengaluru (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 359 days.

(21) Appl. No.: 15/820,109

(22) Filed: Nov. 21, 2017

(65) Prior Publication Data
US 2019/0155962 A1 May 23, 2019

(51) Int. Cl.
*G06F 16/00* (2019.01)
*G06F 16/9032* (2019.01)
*G06F 16/9535* (2019.01)

(52) U.S. Cl.
CPC .... *G06F 16/90328* (2019.01); *G06F 16/9535* (2019.01)

(58) Field of Classification Search
CPC .......... G06F 16/90328; G06F 16/9535; G06F 16/447; G06F 16/168; G06F 16/54
USPC ................................ 707/727, 754, 737, 748
See application file for complete search history.

(56) References Cited

U.S. PATENT DOCUMENTS

| | | | |
|---|---|---|---|
| 6,434,550 B1 * | 8/2002 | Warner | G06F 16/30 |
| 6,611,842 B1 * | 8/2003 | Brown | G06Q 30/02 |
| 6,701,309 B1 * | 3/2004 | Beeferman | G06F 16/3325 |
| 7,466,859 B2 | 12/2008 | Chang et al. | |
| 7,885,849 B2 * | 2/2011 | Gross | G06Q 30/02 |
| 7,890,526 B1 | 2/2011 | Brewer et al. | |
| 7,966,334 B1 * | 6/2011 | Bezos | G06Q 30/06 |
| | | | 707/748 |

(Continued)

OTHER PUBLICATIONS

"Search and get browsing suggestions in Internet Explorer 11", 4 pages. Retrieved on Jun. 23, 2017 from http://support.microsoft.com/en-in/help/17297/windows-internet-explorer-11-search-get-browsing-suggestions.

(Continued)

*Primary Examiner* — Mohammed R Uddin
(74) *Attorney, Agent, or Firm* — Tucker Ellis LLP

(57) ABSTRACT

In accordance with an embodiment, described herein is a system and method for determining and displaying a list of suggested search items for a search field based on prior user interaction. A suggestion curator provided at a client device can display a plurality of suggested search items to a user who is performing a search. The system can display the plurality of suggested search items in an order that is based on a rating associated with each item. The rating can be assigned to each search item upon its selection by the user, and adjusted in response to subsequent search item selections by the user. The system can be configured to adjust each rating by different amounts based on metadata describing how recently the search item was last selected by the user. The system can then re-order the plurality of suggested search items in accordance with the adjusted ratings.

19 Claims, 11 Drawing Sheets

(56) References Cited

U.S. PATENT DOCUMENTS

| | | | |
|---|---|---|---|
| 8,370,329 B2* | 2/2013 | Gutt | G06F 16/3326 707/721 |
| 8,412,699 B1* | 4/2013 | Mukherjee | G06F 16/9535 707/713 |
| 8,412,728 B1 | 4/2013 | Roskind | |
| 8,972,391 B1* | 3/2015 | McDonnell | H04L 67/10 707/727 |
| 9,015,148 B2 | 4/2015 | White et al. | |
| 9,075,898 B1 | 7/2015 | Ayzenshtat et al. | |
| 9,122,758 B1* | 9/2015 | Blower | G06F 16/9535 |
| 9,342,626 B1* | 5/2016 | Das | G06F 16/90324 |
| 9,477,767 B1 | 10/2016 | Finkelstein et al. | |
| 9,652,556 B2 | 5/2017 | Whitelaw et al. | |
| 9,691,096 B1* | 6/2017 | Dai | G06Q 30/0631 |
| 10,496,649 B1* | 12/2019 | Das | G06F 16/24578 |
| 2006/0143236 A1* | 6/2006 | Wu | G11B 27/034 |
| 2008/0120287 A1* | 5/2008 | Guan | G06Q 30/02 |
| 2010/0250336 A1* | 9/2010 | Selinger | G06Q 30/02 705/26.7 |
| 2012/0221505 A1* | 8/2012 | Evans | G06F 16/958 706/52 |
| 2013/0124538 A1* | 5/2013 | Lee | H04L 63/105 707/749 |
| 2014/0012794 A1* | 1/2014 | Dillon | G06Q 30/0631 706/46 |
| 2014/0067596 A1* | 3/2014 | McGovern | G06Q 30/02 705/26.7 |
| 2014/0157295 A1* | 6/2014 | Jagtiani | H04N 21/25891 725/13 |
| 2014/0280289 A1 | 9/2014 | Marantz et al. | |
| 2015/0019469 A1* | 1/2015 | Ioannidis | H04N 21/466 706/46 |
| 2015/0294377 A1* | 10/2015 | Chow | G06Q 30/0263 705/347 |
| 2015/0324435 A1 | 11/2015 | Hsieh | |
| 2016/0246791 A1* | 8/2016 | Long | G06F 16/9535 |
| 2016/0283481 A1* | 9/2016 | Morley | G06Q 30/0256 |
| 2018/0218082 A1* | 8/2018 | Mitra | G06F 16/957 |

OTHER PUBLICATIONS

Sullivan, Danny,. "How Google Instant's Autocomplete Suggestions Work", Apr. 6, 2011, 9 pages. Retrieved on Jun. 23, 2017 from http://searchengineland.com/how-google-instant-autocomplete-suggestions-work-62592.

Walker, Tommy,. "6 Essential Principles of Designing a High Converting Site Search Experience", 26 pages. Retrieved Jun. 23, 2017 from http://conversionxl.com/6-essential-principles-designing-high-converting-site-search-results/.

* cited by examiner

SYSTEM AND METHOD FOR DETERMINING AND DISPLAYING A LIST OF SUGGESTED SEARCH ITEMS FOR A SEARCH FIELD BASED ON PRIOR USER INTERACTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems for processing search queries, and are particularly related to a system and method for determining and displaying a list of suggested search items for a search field based on prior user interaction.

BACKGROUND

Search queries performed within a web browser, web application, or other software application can be made more user-friendly and efficient by suggesting search items to be input. For example, a search field within a browser can be configured to display a dropdown list of suggested items, to aid a user with lookup of an item. The list can include selections recently made by the user, and may be presented in an arbitrary format such as in alphabetic or chronological order. However, prior systems generally require the user to scroll through all of the items in the list until the desired search item is identified.

SUMMARY

In accordance with an embodiment, described herein is a system and method for determining and displaying a list of suggested search items for a search field based on prior user interaction. A suggestion curator provided at a client device can display a plurality of suggested search items to a user who is performing a search. The system can display the plurality of suggested search items in an order that is based on a rating associated with each item. The rating can be assigned to each search item upon its selection by the user, and adjusted in response to subsequent search item selections by the user. The system can be configured to adjust each rating by different amounts based on metadata describing how recently the search item was last selected by the user. The system can then re-order the plurality of suggested search items in accordance with the adjusted ratings.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

As described above, a dropdown list of suggested items can be displayed to aid a user with lookup of an item. The list can include selections recently made by the user, and may be presented in an arbitrary format such as in alphabetic or chronological order. However, prior systems generally require the user to scroll through all of the items in the list until the desired search item is identified.

In accordance with an embodiment, described herein is a system and method for determining and displaying a list of suggested search items for a search field based on prior user interaction. A suggestion curator provided at a client device can display a plurality of suggested search items to a user who is performing a search. The system can display the plurality of suggested search items in an order that is based on a rating associated with each item. The rating can be assigned to each search item upon its selection by the user, and adjusted in response to subsequent search item selections by the user. The system can be configured to adjust each rating by different amounts based on metadata describing how recently the search item was last selected by the user. The system can then re-order the plurality of suggested search items in accordance with the adjusted ratings.

Figure 1:
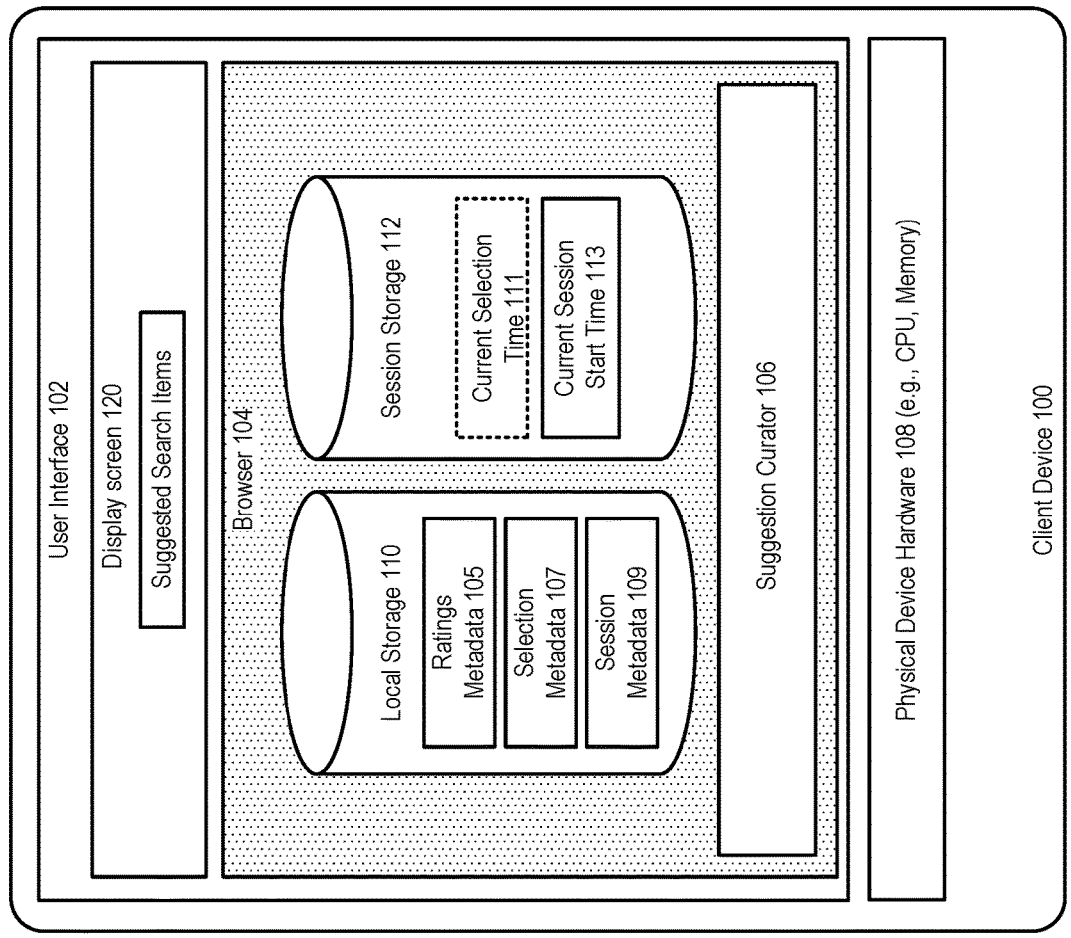
FIG. 1 illustrates a system for determining and displaying a list of suggested search items, in accordance with an embodiment.
Figure 1:
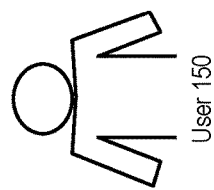

FIG. 1 illustrates a system for determining and displaying a list of suggested search items, in accordance with an embodiment.

As illustrated in FIG. 1, in accordance with an embodiment, a client device 100 includes a user interface 102 including a browser 104 and a display screen 120, and a physical device hardware 108 (e.g., CPU, memory). The browser can include a suggestion curator 106, a local storage 110, and a session storage 112.

In accordance with an embodiment, the local storage component, which can be implemented, for example, as a local storage object, provides a persistent storage that can persist data across multiple browser sessions. In accordance with an embodiment, a browser session can be a login session or user session, and the term "session" as used herein refers to the entire period between user login and user logout. A "current" browser session refers to a presently running browser session in which the user has logged in but has not yet logged out. A "previous" browser session refers to a browser session immediately preceding the current browser session and associated with the same user. An "older" browser session refers to a browser session occurring prior to a previous browser session and associated with the same user. For example, where n represents a current browser session, the previous browser session can be represented by n−1, and older browser sessions can be represented by n−2, n−3, n−4 . . . n−h, where h indicates a number of browser sessions past.

In accordance with an embodiment, the system can persist data, including metadata describing sessions, selections of search items, and ratings associated with search items, across browser sessions using local storage.

In accordance with an embodiment, the session metadata 109 can include or describe start times of separate browser sessions. For example, the system can be configured to record the start time of a current browser session as a timestamp in local storage, upon a user 150 first landing on or otherwise initiating a browser session. The session metadata can also include the start times of the previous browser session and older browser sessions, recorded for example as timestamps in local storage.

In accordance with an embodiment, the selection metadata 107 can include or describe selection times when search items are selected by a user. Selections can be received, for example, in response to a user selecting a search item from within a list of suggested search items displayed at the user interface, or in the case of a new search item, in response to a user inputting the new search item at a search field of the user interface. For example, the system can be configured to record a timestamp in local storage in response to receiving a selection of a search item. The timestamp can be associated with the selected search item and can be used in connection with a subsequent search to determine when the search item was last selected.

In accordance with an embodiment, the ratings metadata 105 can include ratings associated with each suggested search item and determined by the suggestion curator, as further described herein.

In accordance with an embodiment, the local storage can store a list of a plurality of suggested search items, ordered according to their respective ratings, and can provide the list for display at the display screen of the client device. In accordance with an embodiment, the local storage can be configured to store data within a file system at the client device.

In accordance with an embodiment, the session storage component, which can be implemented, for example, as a session storage object, provides a temporary storage in which the lifetime of data is limited to a particular browser session. Data or objects stored in session storage can be purged, for example, when a user logs out of a browser session, such as by closing a tab or window, or otherwise terminating a browser instance. In accordance with an embodiment, the system can store metadata corresponding to a current browser session, including a current session start time 113 and a current selection time 111, in the session storage. In accordance with an embodiment, the session storage can be configured to store data in memory at the client device.

In accordance with an embodiment, the suggestion curator can be configured to determine whether a particular selected search item was previously selected by a user, and if so, how recently (when) it was last selected. The suggestion curator can use this determination to categorize the search item into one of a plurality of categories or buckets according to whether it is a new input (new selection) or a repeat selection by the user. The suggestion curator can assign, adjust, or otherwise determine a rating for each selected search item, for use in generating an ordered list in which a plurality of suggested search items is presented in descending order of their respective ratings. The suggestion curator can be configured to adjust ratings, for example by increasing (incrementing) and decreasing (decrementing) ratings in response to receiving selections of search items. The suggestion curator can be configured to receive or otherwise access data from the local storage and session storage, for use in determining the categories and ratings, and adjustments thereof, for the suggested search items.

In accordance with an embodiment, data stored in local storage and session storage can be associated with particular users, and can be associated with other identifying data, such as particular departments and roles within an enterprise.

Figure 2:
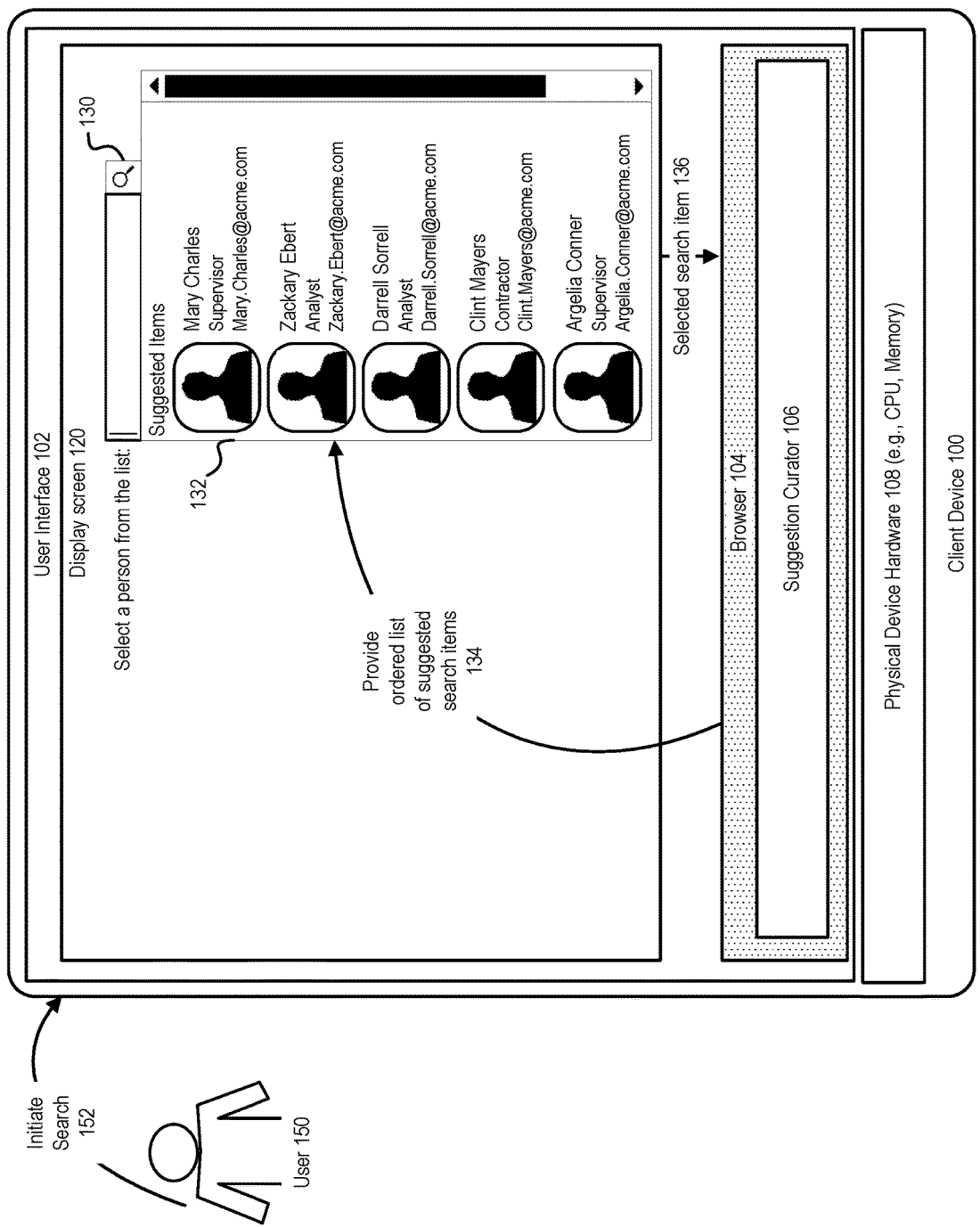
FIG. 2 illustrates determining and displaying a list of suggested search items, in accordance with an embodiment.

FIG. 2 illustrates determining and displaying a list of suggested search items, in accordance with an embodiment.

As illustrated in FIG. 2, in accordance with an embodiment, a user can initiate 152 a search at a search field 130. As one example, the search can be for an individual employee within an enterprise. In accordance with an embodiment, the suggestion curator can be configured to provide 134 an ordered list of suggested search items, in which the search item displayed at the top of the list indicates the item which the system has determined to be most likely to be selected by the user. For example, as illustrated in FIG. 2, a dropdown list 132 of employees within the enterprise can be displayed at the user interface. In accordance with an embodiment, the individuals included in the list are presented in order of those determined as most likely to be selected to those determined as least likely to be selected, based on a rating assigned to each. In accordance with an embodiment, the rating can be determined and adjusted by the suggestion curator based on prior user interaction with each search item.

In accordance with an embodiment, identifying information, such as names, titles, and email addresses, can also be displayed as part of the list. The system can provide an option to filter the displayed information. For example, the system can be configured such that sensitive information such as residence address and nationality of an employee is omitted from the displayed information.

In accordance with an embodiment, after a search item is selected by a user, the selected search item 136, or an indication thereof, can be received at the browser for further processing by the suggestion curator. In accordance with an embodiment, search items within the list other than the selected search item (the non-selected search items), or indications thereof, can also be received by the browser for further processing, as further described herein.

Determining and Displaying a List of Suggested Search Items

Figure 3:
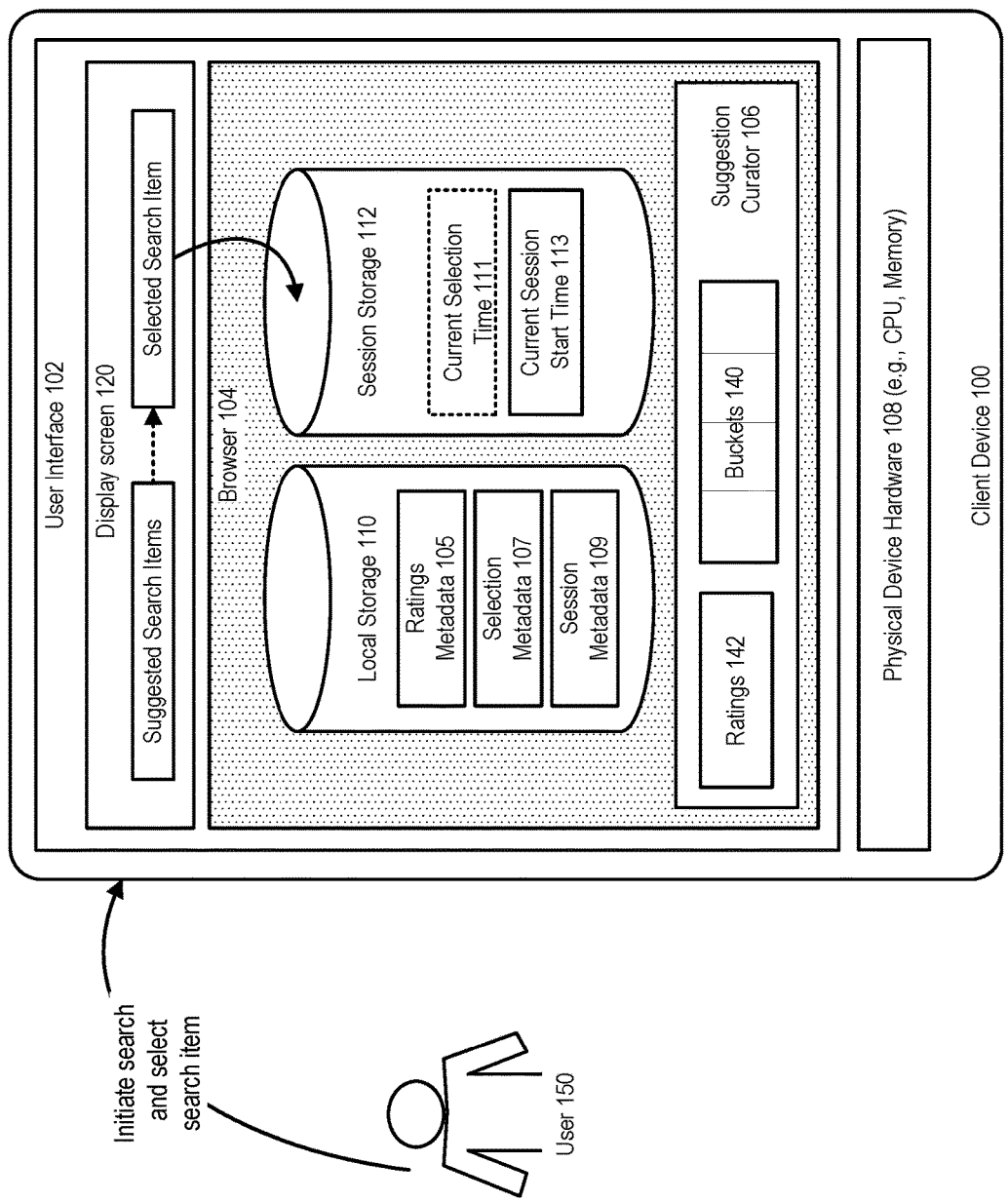
FIG. 3 further illustrates determining and displaying a list of suggested search items, in accordance with an embodiment.

FIG. 3 further illustrates determining and displaying a list of suggested search items, in accordance with an embodiment.

As illustrated in FIG. 3, in accordance with an embodiment, during a browser session in which the user interacts with a browser running on a client device, a user can initiate a search. A plurality of suggested search items can be presented at a user interface of the client device, as an ordered list received from local storage within the browser.

In accordance with an embodiment, the list of suggested search items can be generated by the suggestion curator, as further described below.

In accordance with an embodiment, the user interface can receive a selection of a search item, either by receiving an input of a new search item or by receiving a user selection of a search item from within the list of suggested search item. In response to receiving the selected search item, the browser can store a record or other indication of the selected search item in session storage. The browser can also record and store, in memory, session metadata including the current browser session start time, and selection metadata including the current selection time, in session storage. This information can also be stored in local storage for use in determining suggested search items for subsequent searches.

Use of Buckets

In accordance with an embodiment, search items input or otherwise selected by a user can be categorized into or associated with buckets. The suggestion curator can use a categorization (session classification) process to determine or select a bucket from among a plurality of buckets, for a selected search item, based on whether the search item is a new selection or a repeat selection, and in the case of a repeat selection, when the item was last selected. A categorization process in accordance with an embodiment will be described in further detail below.

Figure 4:
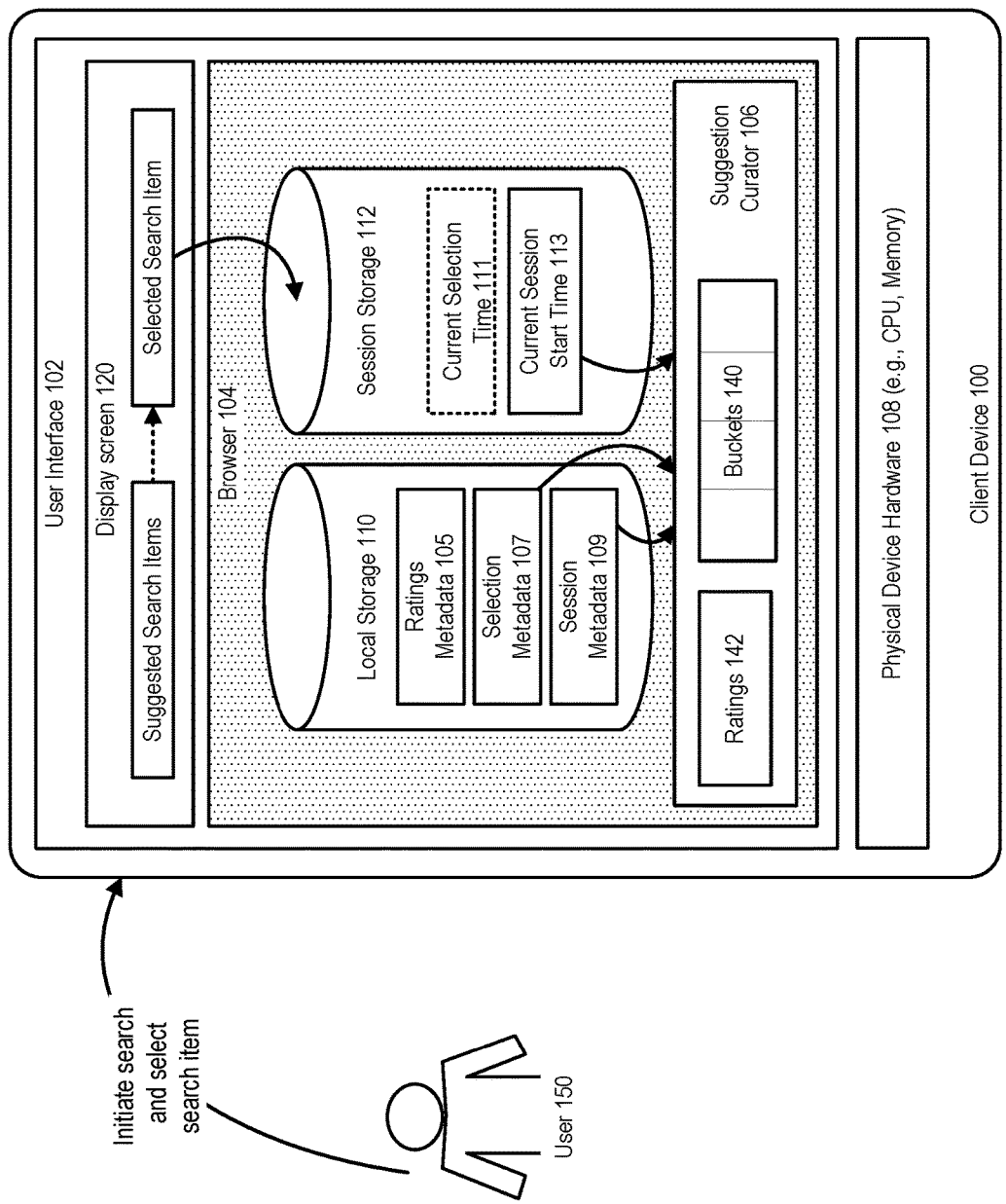
FIG. 4 further illustrates determining and displaying a list of suggested search items, in accordance with an embodiment.

FIG. 4 further illustrates determining and displaying a list of suggested search items, in accordance with an embodiment.

As illustrated in FIG. 4, in accordance with an embodiment, after a selection of a search item is received from a user, data from session storage and local storage can be received by the suggestion curator for use in determining or selecting a category or bucket for the search item, from among a plurality of categories or buckets 140. The received data can include, for example, a data indicative of a start time of the current session, session metadata including a start time of the previous session, and selection metadata indicating a prior selection of the search item, if any.

Figure 5:
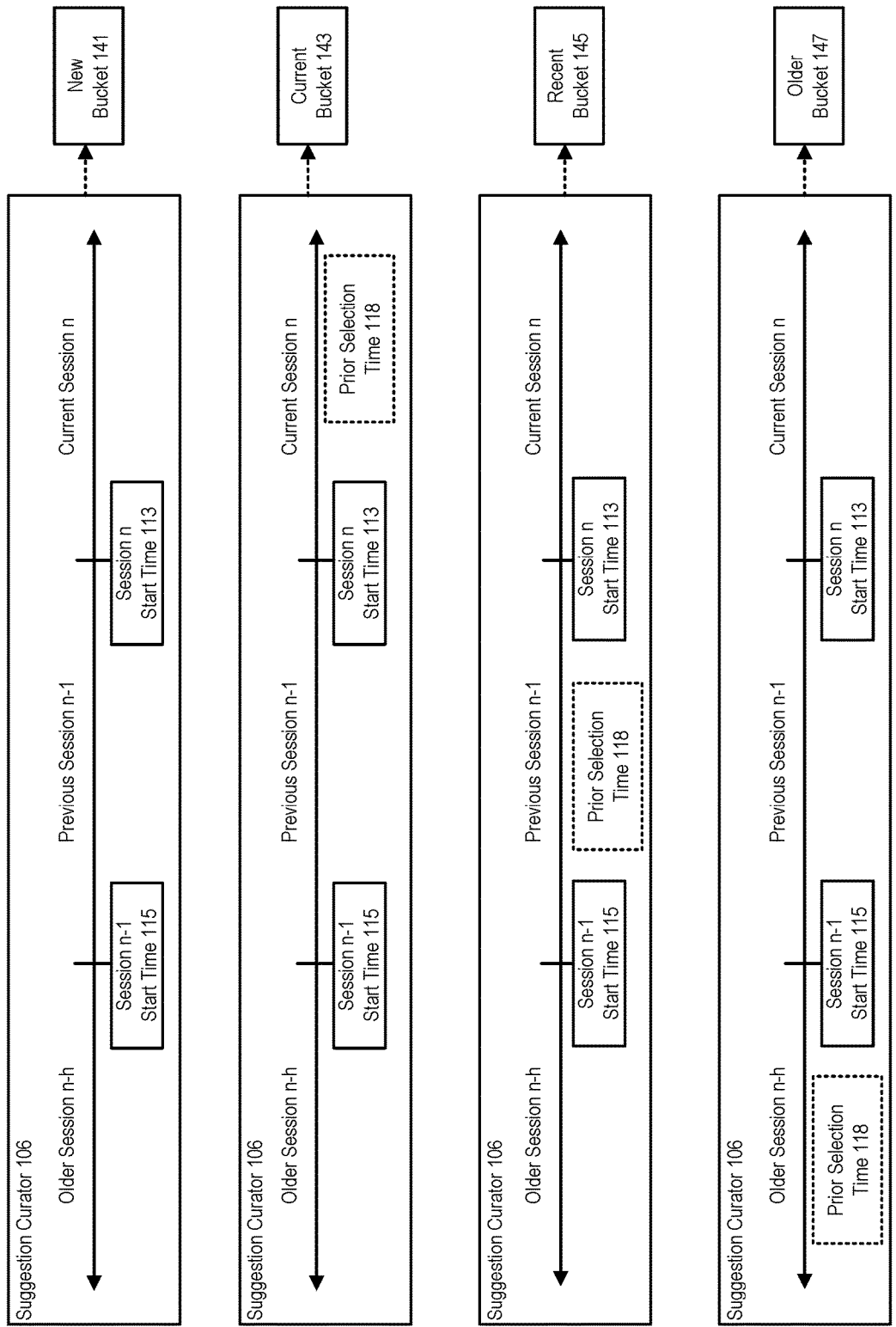
FIG. 5 further illustrates determining and displaying a list of suggested search items, including the use of buckets, in accordance with an embodiment.

FIG. 5 further illustrates determining and displaying a list of suggested search items, including the use of buckets, in accordance with an embodiment.

As illustrated in FIG. 5, in accordance with an embodiment, the suggestion curator can categorize or associate a suggested search item with a bucket selected from a plurality of buckets, including a new bucket 141, a current bucket 143, a recent bucket 145, and an older bucket 147. The new bucket can be associated with newly input search items (new selections) that have not been previously selected by a user. The current bucket can be associated with search items that were last selected by a user during the current browser session. The recent bucket can be associated with search items that were last selected by a user during the previous browser session. The older bucket can be associated with search items that were last selected by a user during an older browser session.

In accordance with an embodiment, the suggestion curator can be configured to determine or select a bucket for a particular search item, based on a timeline (timeline data) indicating the start time of the current browser session (n), the start time of the previous browser session (n−1), and a data describing a prior selection time 118 associated with the most recent previous selection of the search item, if any. The session start time data and prior selection time data can correspond to timestamps stored in local storage and session storage.

In accordance with an embodiment, in response to determining that no prior selection time data is associated with a search item, the suggestion curator can select the new bucket, indicating that the search item is a new selection rather than a repeat selection. For example, the system can determine that a timestamp corresponding to a prior selection has not been set for the particular search item.

In accordance with an embodiment, in response to determining that a prior selection time data is associated with a search item, and that the prior selection time is greater than the start time of the current browser session (n), the suggestion curator can select the current bucket, indicating that the search item is a repeat selection that was last selected during the current browser session.

In accordance with an embodiment, in response to determining that a prior selection time data is associated with a search item, and that the prior selection time is less than the start time of the current browser session (n) and greater than the start time of the previous browser session (n−1), the suggestion curator can select the recent bucket, indicating that the search item is a repeat selection that was last selected during the previous browser session.

In accordance with an embodiment, in response to determining that a prior selection time data is associated with a search item, and that the prior selection time is less than the start time of the previous browser session (n−1), the suggestion curator can select the older bucket, indicating that the search item is a repeat selection that was last selected during an older browser session.

Figure 6:
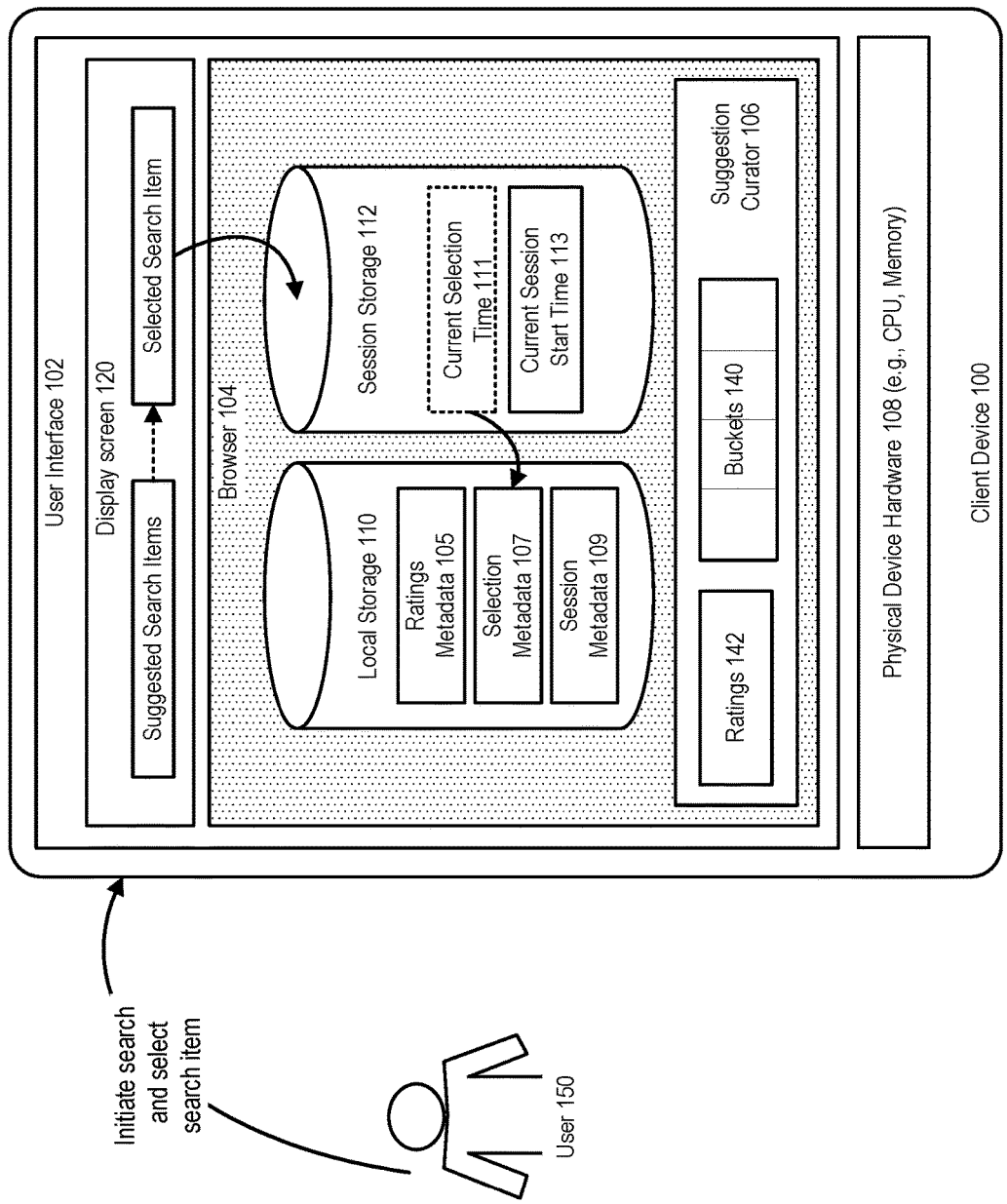
FIG. 6 further illustrates determining and displaying a list of suggested search items, in accordance with an embodiment.

FIG. 6 further illustrates determining and displaying a list of suggested search items, in accordance with an embodiment.

In accordance with an embodiment, after a selection of a search item by a user is received, a prior selection time data associated with the search item can be set or updated to reflect the current selection time. For example, as illustrated in FIG. 6, a data indicative of the current selection time can be stored as part of the selection metadata in local storage. In accordance with an embodiment, the suggestion curator can use the prior selection time data to determine the bucket into which the search item will be classified during the next search, when the next iteration of classification will be performed.

In accordance with an embodiment, the suggestion curator can use a classification of a search item into a particular bucket to determine a rating for the item, as further described below.

Rating of Suggested Search Items

Figure 7:
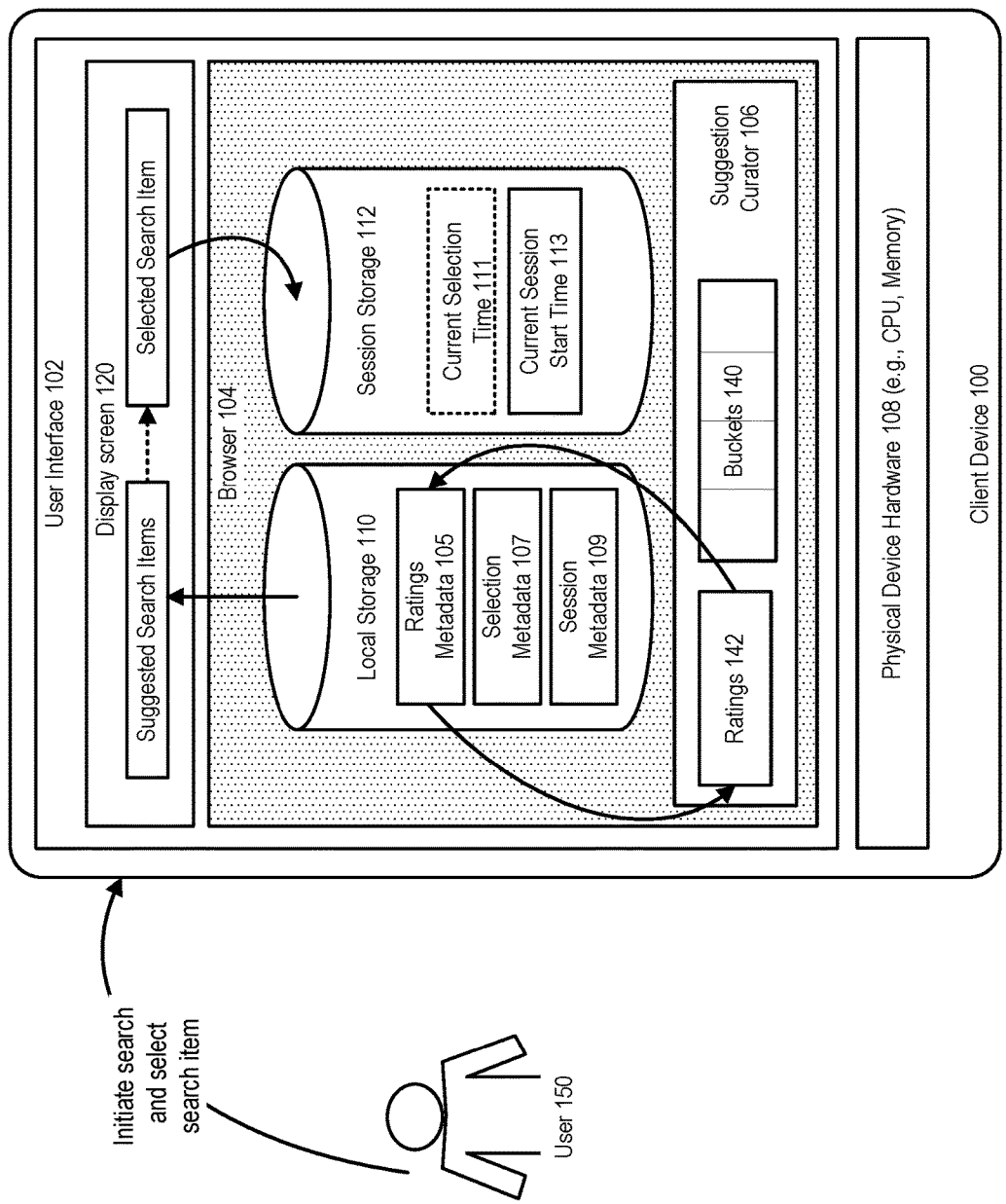
FIG. 7 further illustrates determining and displaying a list of suggested search items, in accordance with an embodiment.

FIG. 7 further illustrates determining and displaying a list of suggested search items, in accordance with an embodiment.

As illustrated in FIG. 7, in accordance with an embodiment, the suggestion curator can use the determination or selection of a particular bucket for a search item to determine or adjust a rating for the search item, as further described below. In accordance with an embodiment, ratings can be indicative of the likelihood or relative probability that each suggested search item will be selected by a user in performing a search, as compared with the other suggested search items in the list. The ratings data 142 can be stored in local storage and updated according to adjustments by the suggestion curator.

In accordance with an embodiment, a rating is assigned to each new search item upon its input at the user interface. After a search item has been input and assigned a rating, it can be displayed within the list of suggested search items, for use in subsequent searches by the user. For each search that is initiated at the user interface, the system can receive a user input or selection of a search item (the selected item) to be used in the search, while the other search items displayed within the list are not selected by the user (the non-selected search items) and are not used in the search.

In accordance with an embodiment, ratings for the selected item and the non-selected search items can be adjusted upon or in response to received user selections. The order in which suggested search items are displayed can be updated as selections are received from the user, whether in the current browser session or in later browser sessions, and as ratings are correspondingly adjusted.

In accordance with an embodiment, the suggestion curator can receive current ratings data from local storage, and after adjustment, the updated ratings data can be stored in local storage for use in providing the ordered list of suggested search items.

Figure 8:
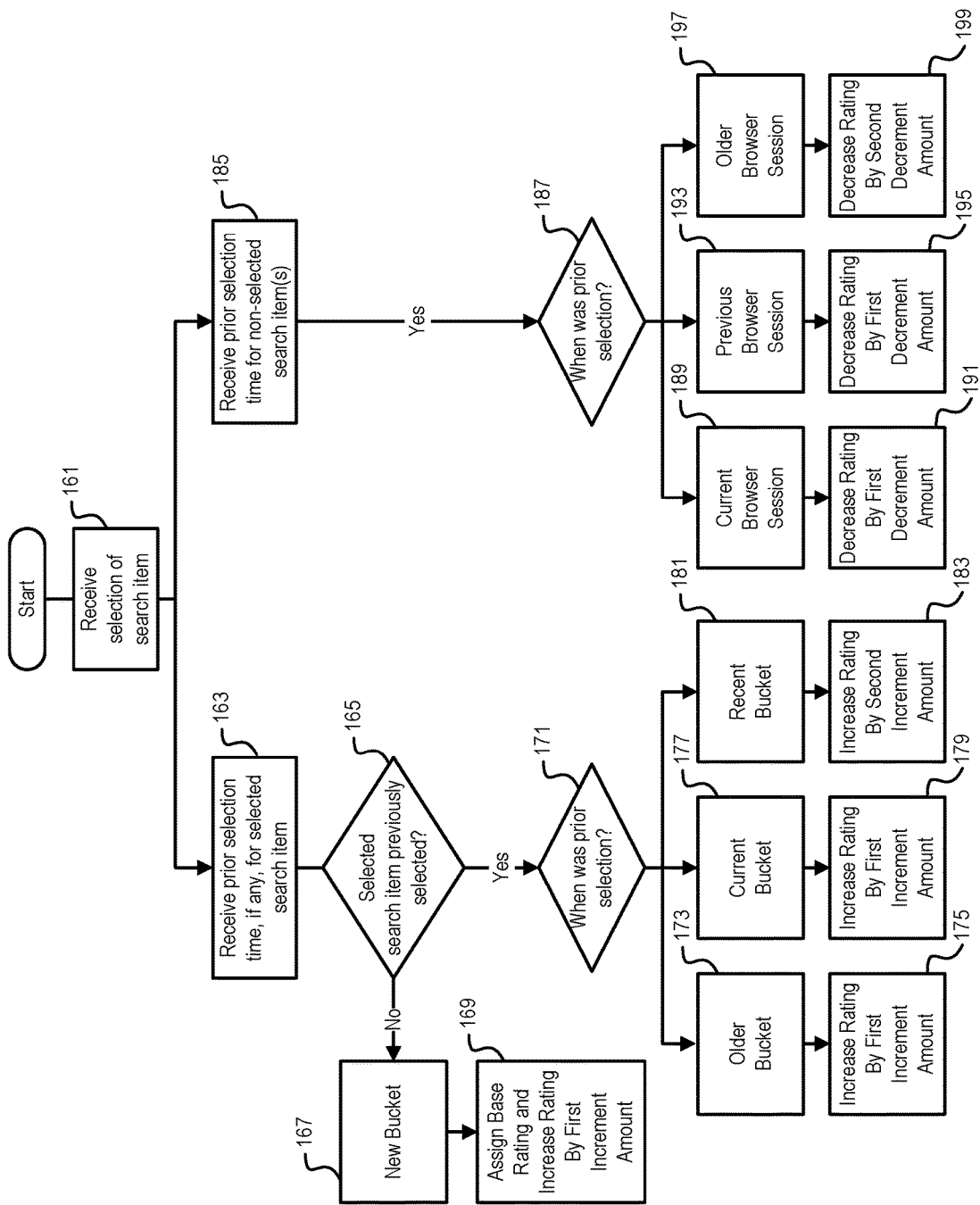
FIG. 8 illustrates a flow chart describing rating of suggested search items, in accordance with an embodiment.

FIG. 8 illustrates a flow chart describing rating of suggested search items, in accordance with an embodiment.

In FIG. 8, operations 161 to 183 illustrate a rating promotion process which can be implemented, for example, by software or program code that is executable by a computer system or other processing device. Operations 185 to 199 illustrate a rating demotion process which can be implemented, for example, by software or program code that is executable by a computer system or other processing device.

As illustrated in FIG. 8, in accordance with an embodiment, at operation 161 the system receives a selection of a search item from a user. The search item can be a new selection or a repeat selection by the user.

In accordance with an embodiment, at operation 163 the system receives, in response to the selection of the search item at operation 161, a data indicative of a prior selection time, if any, associated with the selected search item.

In accordance with an embodiment, at operation 165 the system determines whether the selected search item was previously selected by the user, based on the received prior selection time data, if any.

In accordance with an embodiment, at operation 167, in response to determining that there is no prior selection time data associated with the selected search item, the system associates the item with the new bucket and, at operation 169, assigns a base rating to the item and increases the rating by an amount (a first increment amount).

In accordance with an embodiment, in response to determining, based on the received prior selection time data, that the selected search item was previously selected by the user, then at operation 171 the system determines when the search item was last selected by the user (e.g., during which browser session).

In accordance with an embodiment, in response to determining that the prior selection time data indicates a prior selection by the user during an older browser session, at operation 173 the system associates the item with the older bucket and increases, at operation 175, the item's rating by the same amount (the first increment amount) as in operation 169.

In accordance with an embodiment, in response to determining that the prior selection time data indicates a prior selection by the user during the current browser session, at operation 177 the system associates the item with the current bucket and increases, at operation 179, the item's rating by the same amount (a first increment amount) as in operation 175 for items in the older bucket.

In accordance with an embodiment, in response to determining that the prior selection time data indicates a prior selection by the user during the previous browser session, at operation 181 the system associates the item with the recent bucket and increases, at operation 183, the item's rating by an amount (a second increment amount) that is greater than the amount (the first increment amount) by which items in the older bucket and current bucket would be increased at operations 175 and 179, respectively.

In accordance with an embodiment, at operation 185 the system receives, in response to the selection of the search item at operation 161, a data indicative of a prior selection time for each of the non-selected search items in the list.

In accordance with an embodiment, at operation 187 the system determines, based on the received prior selection time data, when each non-selected search item was last selected by the user (e.g., during which browser session).

In accordance with an embodiment, at operation 189, in response to determining that the prior selection time data indicates a prior selection by the user during the current browser session, the system decreases, at operation 191, the item's rating by an amount (a first decrement amount).

In accordance with an embodiment, at operation 193, in response to determining that the prior selection time data indicates a prior selection by the user during the previous browser session, the system decreases, at operation 195, the item's rating by the same amount (a first decrement amount) as in operation 191.

In accordance with an embodiment, at operation 197 in response to determining that the prior selection time data indicates a prior selection by the user during an older browser session, the system decreases, at operation 199, the item's rating by an amount (a second decrement amount) that is greater than the amount by which the ratings would be decreased at operations 191 and 195.

Figure 9:
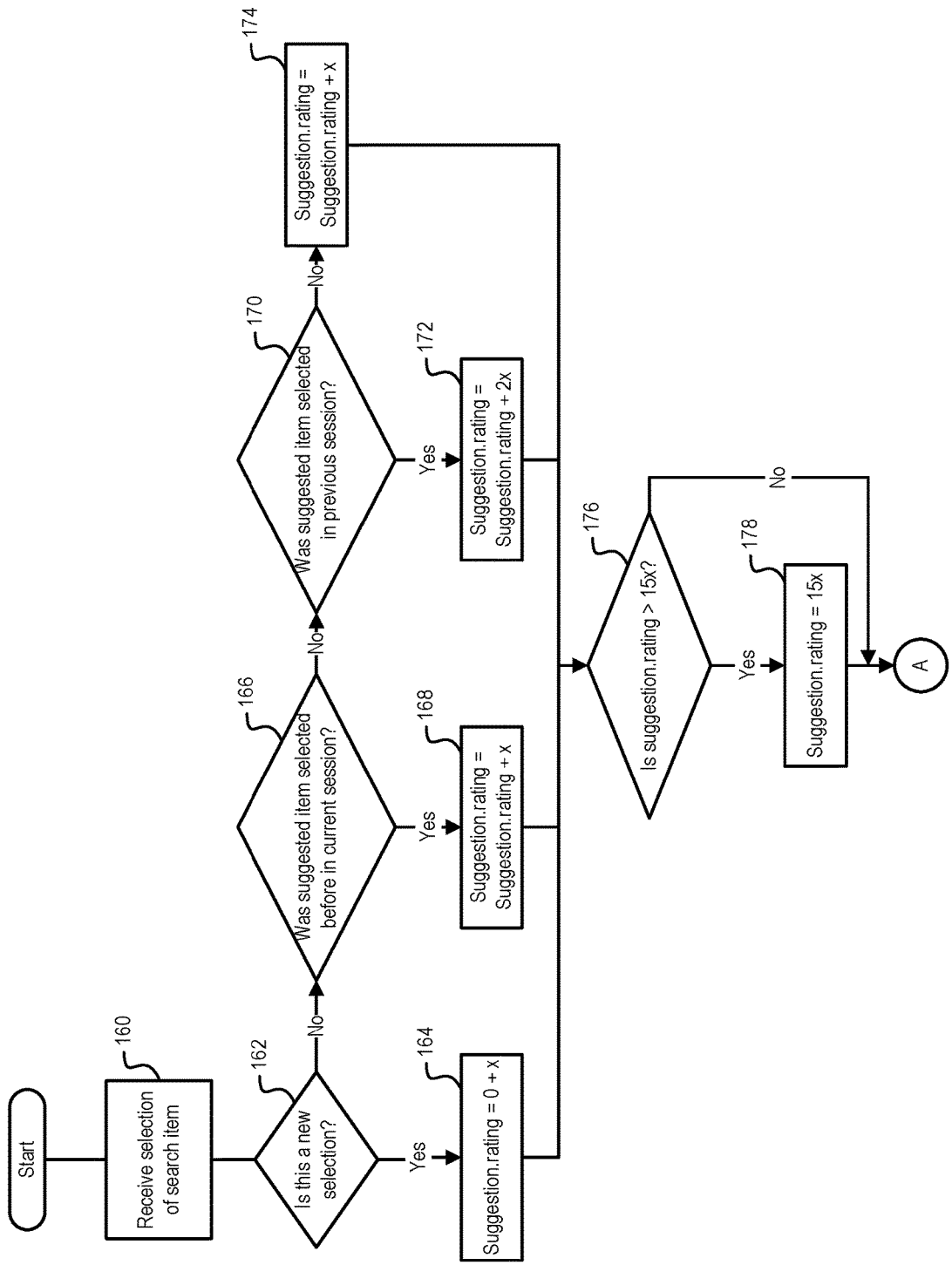
FIG. 9 illustrates a flow chart describing rating of suggested search items, in accordance with an embodiment.

FIG. 9 illustrates a flow chart describing rating of suggested search items, in accordance with an embodiment.

As illustrated in FIG. 9, in accordance with an embodiment, at operation 160 the system receives a selection of a search item from a user.

In accordance with an embodiment, at operation 162 the system determines whether the search item is a new selection by the user. For example, the system can check whether a prior selection time data is associated with the search item. If not, the search item is determined to be a new selection, and at operation 164 the system assigns a base rating to the search item and increases the base rating by an increment amount. For example, a data object suggestion.rating can be set with a base value of 0 and then increased by an increment amount of x units. As used herein, the term "units" is used as an example to describe values associated with ratings, and is not intended to be limited to any particular unit of measurement. For example, in accordance with an embodiment, the system can assign a rating having a value from 0 to 200, referred to herein as units. In accordance with an embodiment, the system can use the rating, measured in arbitrary units, to compare the relevancy of one search item to another.

In accordance with an embodiment, in response to determining that the search item is not a new selection but a repeat selection by the user (e.g., the item does have a prior selection time data associated therewith), the system determines when (e.g., during which browser session) the search item was last selected by the user.

In accordance with an embodiment, at operation 166 the system determines whether the search item was selected before in the current browser session. If so, at operation 168 the system increments the present rating associated with the item by the increment amount of x units.

In accordance with an embodiment, in response to determining that the search item was not selected before in the current browser session, at operation 170 the system determines whether the search item was selected in the previous browser session. If so, at operation 172 the system increments the present rating associated with the item by a different increment amount of 2× units.

In accordance with an embodiment, in response to determining that the suggested search item was not selected before in the current browser session or the previous browser session, the system determines that the suggested search item was last selected in an older browser session. In accordance with an embodiment, at operation 174 the system increments the present rating associated with the item by the increment amount of x units.

In accordance with an embodiment, the system can be configured to increase ratings by different increment amounts based on when search items were last selected, so that items within the list can be promoted at different rates. For example, as illustrated in operations 164, 168, and 174, ratings for new selections and repeat selections from the current browser session and older browser sessions can be increased by an equal increment amount x, so that they are promoted to an equal extent within the list. As illustrated in operation 170, ratings for repeat selections from the immediately preceding browser session can be increased by a greater increment amount 2×, so that they are promoted to a greater extent (more quickly) within the list.

In accordance with an embodiment, a repeat selection of a suggested search item that was last selected in the previous browser session indicates the continued relevance of the item, and a higher probability of its relevance in the current set or displayed list of search items from which the user can make a selection, as well.

In accordance with an embodiment, at operation 176, the system compares each rating to a maximum rating cap of, for example, 15×. If the rating is determined to exceed the maximum rating cap, at operation 178 the rating is set at the maximum cap amount. In accordance with an embodiment, the use of a maximum rating cap can prevent a suggested search item from clinging to the list for an excessive length of time as a result of being selected by a user more frequently when compared with other items in the same list.

Figure 10:
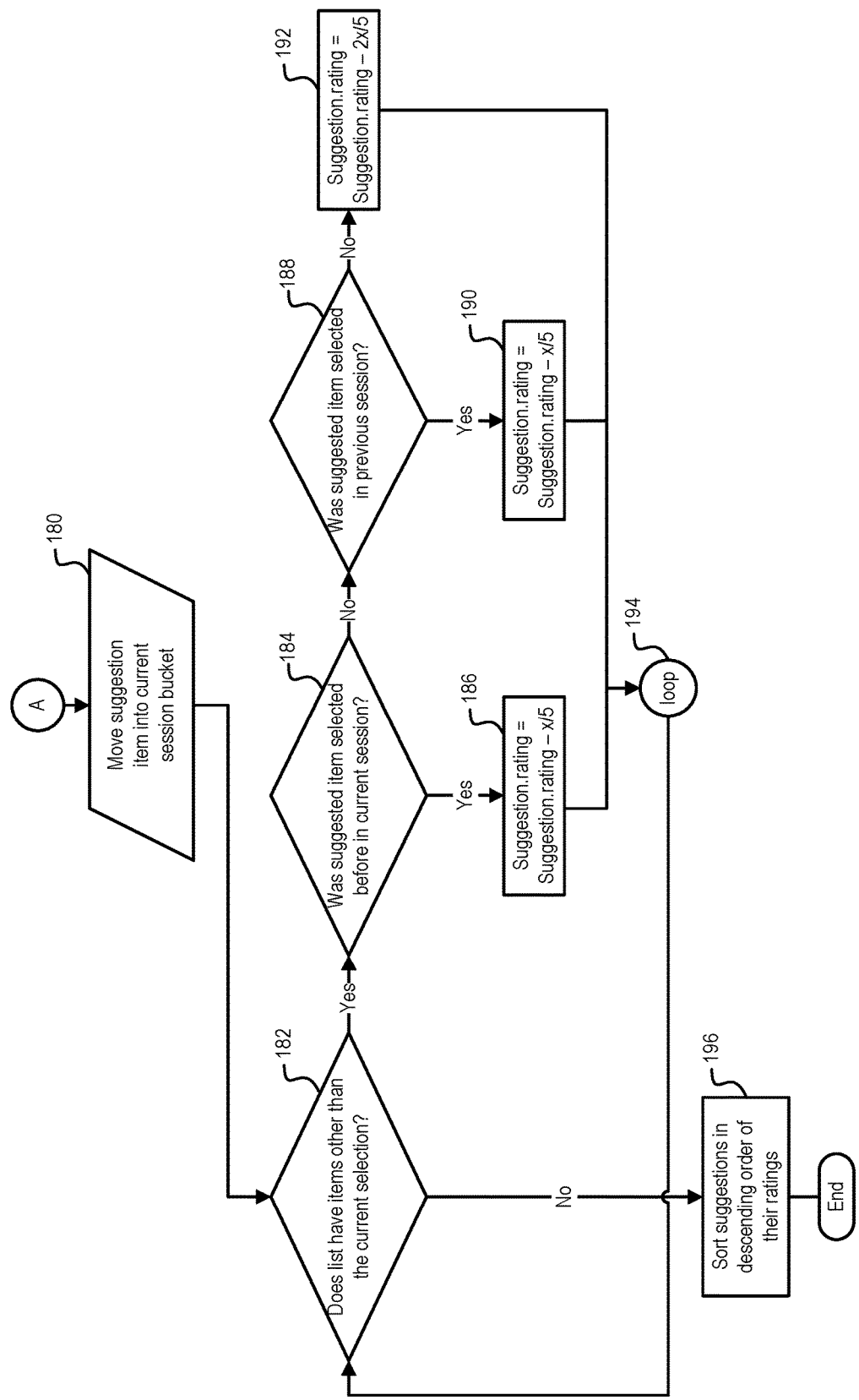
FIG. 10 further illustrates a flow chart describing rating of suggested search items, in accordance with an embodiment.

FIG. 10 further illustrates a flow chart describing rating of suggested search items, in accordance with an embodiment.

As illustrated in FIG. 10, in accordance with an embodiment, at operation 180 the system associates the selected search item with (or moves it into) the current bucket, indicating that the search item was selected by the user during the current browser session.

In accordance with an embodiment, at operation 182 the system determines whether the list of suggested search items contains items other than the selected search item that was selected at operation 160. If so, the system decreases (decrements) their respective ratings to prevent these other non-selected items from remaining too high up in the ordered list. In other words, each time a selection of a search item has been made by the user, whether it is a new selection or a repeat selection, the rating associated with the selected item can be increased, while the ratings associated with the non-selected items can be decreased.

In accordance with an embodiment, for each non-selected item, at operation 184 the system determines whether the search item was selected before in the current browser session. If so, at operation 186 the system decreases the present rating associated with the item by a decrement amount of x/5 units. Again, the term "units" is used herein as an example to describe values associated with ratings, and is not intended to be limiting.

In accordance with an embodiment, in response to determining that the search item was not selected by the user before in the current browser session, at operation 188 the system determines whether the search item was selected in the previous browser session. If so, the system decreases the present rating associated with the item by the decrement amount of x/5 units.

In accordance with an embodiment, in response to determining that the suggested search item was not selected by the user before in the current browser session or the previous browser session, the system determines that the suggested search item was last selected by the user in an older browser session. In accordance with an embodiment, at operation 192 the system decreases the present rating associated with the item by a different decrement amount of 2×/5 units.

In accordance with an embodiment, the system can be configured to decrease ratings for non-selected items by different decrement amounts based on when they were last selected, so that items within the list can be demoted at different rates. For example, as illustrated in operations 186 and 188, ratings for items last selected during the current browser session and the previous browser session can be decreased by an equal decrement amount x/5, so that they are demoted to an equal extent within the list. As illustrated in operation 192, ratings for items last selected during older browser sessions can be decreased by a greater decrement amount 2×/5, so that they are demoted to a greater extent (more quickly) within the list.

In accordance with an embodiment, the decrement amount by which ratings for non-selected items are decreased can be less than (e.g., a fraction of) the increment amount by which ratings for selected items are increased, to enable less frequently selected items to be more gradually demoted within the list than more frequently selected items are promoted.

In accordance with an embodiment, at operation 194 the process continues to loop, until all search items in the list have been rated or have had their rating adjusted. At operation 196, if there are no further items in the list to rate or adjust, the system can sort the suggested search items in descending order of their ratings.

In an example embodiment, the suggestion curator can be configured to standardize the increment amount x to a value of 20, such that new selections are assigned an base rating of 0 and are initially increased by 20, ratings for repeat selections from the current and older browser sessions are increased by 20, and ratings for repeat selections from the previous browser session are increased by a rating bump of 40. Upon every selection of a search item by a user, ratings for non-selected search items can be decreased by 4 for items that were last selected in the current or previous browser session, and decreased by 8 for items that were last selected in older browser sessions. The maximum rating cap can be set at 200, beyond which a rating is not increased.

In accordance with an embodiment, the system can be configured to apply a limit to the number of suggested search items that can be included in a list. The system can be configured to remove the suggested search item with the lowest rating from the list, in response to addition of a new search item to the list that results in the list length exceeding the limit. Additionally, each search item can be associated with an age or other indication of when the item was first assigned a rating. In the case of multiple search items having the same lowest rating, the search item that was first assigned a rating and hence is the oldest, can be removed from the list.

In accordance with an embodiment, the system enables a suggested search item that is selected often across browser sessions to receive a higher rating than an item that is selected only in the current browser session, but never selected again, or that is not selected often across browser sessions. The system can also enable older suggested search items that are not selected by the user to be penalized to a greater extent by reducing their ratings by a greater amount, when compared with other non-selected search items.

Figure 11:
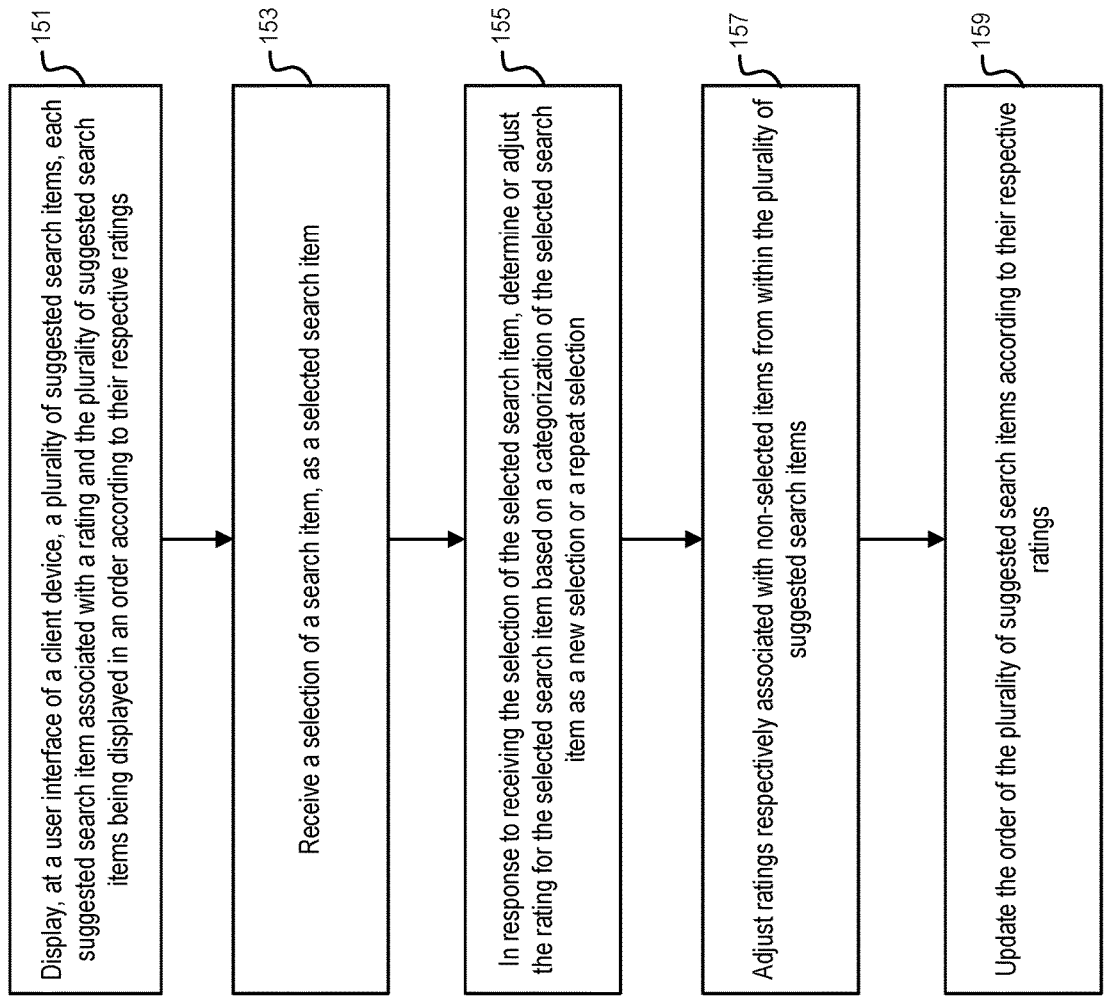
FIG. 11 illustrates a method of determining and displaying a list of suggested search items, in accordance with an embodiment.

FIG. 11 illustrates a method of determining and displaying a list of suggested search items, in accordance with an embodiment.

As illustrated in FIG. 11, in accordance with an embodiment, at operation 151 the system displays, at a user interface of a client device, a plurality of suggested search items, each suggested search item associated with a rating and the plurality of suggested search items being displayed in an order according to their respective ratings.

In accordance with an embodiment, at operation 153 the system can receive a selection of a search item, as a selected search item.

In accordance with an embodiment, at operation 155, in response to receiving the selection of the selected search item, the system can determine or adjust the rating for the selected search item based on a categorization of the selected search item as a new selection or a repeat selection.

In accordance with an embodiment, at operation 157 the system can adjust ratings respectively associated with non-selected items from within the plurality of suggested search items.

In accordance with an embodiment, at operation 159 the system can update the order of the plurality of suggested search items according to their respective ratings.

In accordance with an embodiment, the system can curate a list of suggested search items based on a custom rating process, to ensure that the suggestion determined to have the highest likelihood of being selected is listed first. The system can be configured to determine the highest likelihood based on historic usage patterns and suggestion selections by a user over several sessions.

In accordance with an embodiment, the system can monitor and track behavioral metadata indicating when and how often selections are made by the user, rather than simply recording recent selections and displaying them back. Updated behavioral metadata can be used to re-order suggestions in the list.

In accordance with an embodiment, by presenting suggested search items in order of their ratings, suggestions that are determined by the system to be more likely to be selected by the user, because they are more relevant to what the user might be searching for, can be displayed more prominently. According to some embodiments suggested search items can be promoted within a list at different rates (by having their ratings increased by different amounts) and/or demoted within a list at different rates (by having their ratings decreased by different amounts), based on data describing the frequency of selection of the items and the timing of prior selections. In accordance with an embodiment, the system can be configured to continuously monitor user selections, and automatically tune the list of suggested search items accordingly.

In accordance with an embodiment, because the curating and managing of search items is performed locally within the browser at the client device, without any roundtrips to an external server, suggested search item retrieval and ordering does not require network connectivity and can be more responsive.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in a cloud as part of, or as a service of, a cloud computing system based on shared, elastic resources delivered to users in a self-service, metered manner using Web technologies. Characteristics of the cloud can include on-demand self-service; broad network access; resource pooling; rapid elasticity; and measured service. Examples of cloud deployment models include: Public, Private, and Hybrid. Examples of cloud service models include Software as a Service (SaaS), Platform as a Service (PaaS), Database as a Service (DBaaS), and Infrastructure as a Service (IaaS). As used herein, the cloud can be a combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description of the present invention has been provided for the purposes of illustration and description. It is not intended to be exhaustive or to limit the invention to the precise forms disclosed. Many modifications and variations will be apparent to the practitioner skilled in the art.

For example, although the examples illustrated herein refer to a browser, embodiments as described herein can be used with other types of software applications that provide an interface.

Additionally, while many of the embodiments described herein illustrate the use of a dropdown list of suggested search items, in which items associated with higher ratings appear higher up in the list, embodiments are not limited thereto, and suggested search items can be presented in any suitable format, such as in a visual array or grid. Items associated with higher ratings can be indicated in any suitable matter, such as by displaying them in bold or in a different color than lower rated items.

Moreover, while many of the embodiments described herein illustrate ordering a list of suggested search items in accordance with a particular user's selections during browser sessions, embodiments are not limited thereto, and can be applied to cover groups of users based on their roles or permissions relating to or within a browser or other application. For example, in accordance with an embodiment, the system can suggest search items based on activities and selections of other users, such as users in a similar region or within the same enterprise. The system can also be configured to perform network synchronization of ratings for search items selected by a plurality of users, and present suggested search items in an ordering according to the synchronized ratings.

Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may be incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for determining and displaying a list of suggested search items, the system comprising:
   a computer including a processor, local storage, and a browser; and
   a suggestion curator provided on the computer and configured to
      store, in the local storage in the computer, search history data including search item ratings;
      display, in response to a search request entered by a user, at a user interface of the computer, a plurality of suggested search items, each suggested search item being associated with a rating from said search history data, and the plurality of suggested search items being displayed in an order according to their respective ratings,
      in response to receiving a selection by the user of a search item, as a selected item, categorize the selected item as a new selection if the selected item has not previously been selected by the user and categorize the selected item as a repeat selection if the selected item has previously been selected by the user and determine a browser session in which the selected item was previously selected;
      determine a rating for the selected item when the selected item is categorized as a new selection and change a rating for the selected item based when the selected item is categorized as a repeat selection, wherein said change is dependent upon the determined browser session in which the selected item was previously selected by the user,
      store the rating for the selected item in the local storage in the computer to thereby update the order in which the plurality of suggested search items is displayed, according to the determined rating for the selected item,
      whereby the user is provided a display of the plurality of suggested search items in the order responsive to prior search and selection actions of the user.

2. The system of claim 1, wherein the categorization of the selected item as a new selection is in response to determining that the selected item has not been previously selected.

3. The system of claim 1, wherein determining the browser session during which the selected item was last selected comprises, determining whether the selected item was last selected in one of a current browser session, a previous browser session, or an older browser session.

4. The system of claim 1, wherein the browser accesses the local storage for storing data describing start times of one or more browser sessions, and selection times of particular search items.

5. The system of claim 1, wherein the suggestion curator is configured to adjust the rating for a selected item categorized as a repeat selection, by increasing the rating based on a prior selection time data associated with the selected item.

6. The system of claim 5, wherein the rating is increased by a greater amount for a selected item associated with a prior selection time data during a previous browser session than for a selected item associated with a prior selection time data during a current browser session or an older browser session.

7. The system of claim 1, wherein the suggestion curator is further configured to adjust a rating associated with a non-selected item from within the plurality of suggested search items, by decreasing the rating according to a prior selection time data associated with the non-selected item.

8. The system of claim 7, wherein the rating is decreased by a greater amount for a non-selected item associated with a prior selection time data during an older browser session than for a non-selected item associated with a prior selection time data during a current browser session or a previous browser session.

9. The system of claim 1, wherein the suggestion curator is configured to, in response to receiving the selection, increase the rating for the selected item by an increment amount, and decrease each of the ratings respectively associated with non-selected items from within the plurality of suggested search items by at least one decrement amount, and the increment amount is greater than the at least one decrement amount.

10. A method for determining and displaying a list of suggested search items, the method comprising:
providing, at a computer including a processor, a local storage, and a browser, a suggestion curator:
storing, in the local storage in the computer, search history data including search item ratings;
receiving a search request entered by a user';
displaying, in response to the search request, at a user interface of the computer, a plurality of suggested search items, each suggested search item being associated with a rating from said search history data, and the plurality of suggested search items being displayed in an order according to their respective ratings,
receiving a selection by the user of a search item as a selected item;
in response to receiving the selection, categorizing the selected item as a new selection if the selected item has not previously been selected by the user and categorizing the selected item as a repeat selection if the selected item has previously been selected by the user and determining a browser session in which the selected item was previously selected;
determining a rating for the selected item when the selected item is categorized as a new selection and changing a rating for the selected item when the selected item is categorized as a repeat selection, wherein said changing is dependent upon the determined browser session in which the selected item was previously selected by the user,
storing the rating for the selected item in the local storage in the computer to thereby update the order in which the plurality of suggested search items is displayed, according to the determined rating for the selected item,
whereby the user is provided a display of the plurality of suggested search items in the order responsive to prior search and selection actions of the user.

11. The method of claim 10, wherein the categorization of the selected item as a new selection is in response to determining that the selected item has not been previously selected.

12. The method of claim 10, wherein determining the browser session during which the selected item was last selected comprises, determining whether the selected item was last selected in one of a current browser session, a previous browser session, or an older browser session.

13. The method of claim 10, wherein the browser accesses the local storage for storing data describing start times of one or more browser sessions, and selection times of particular search items.

14. The method of claim 10, wherein changing the rating for the selected item when the selected item is categorized as a repeat selection comprises increasing the rating based on a prior selection time data associated with the selected item.

15. The method of claim 14, wherein the rating is increased by a greater amount for a selected item associated with a prior selection time data during a previous browser session than for a selected item associated with a prior selection during a current browser session or an older browser session.

16. The method of claim 10, further comprising adjusting a rating associated with a non-selected item from within the plurality of suggested search items, by decreasing the rating according to a prior selection time data associated with the non-selected item.

17. The method of claim 16, wherein the rating is decreased by a greater amount for a non-selected item associated with a prior selection time data during an older browser session than for a non-selected item associated with a prior selection time data during a current browser session or a previous browser session.

18. The method of claim 10, further comprising, in response to receiving the selection, increasing the rating for the selected item by an increment amount, and decreasing each of the ratings respectively associated with non-selected items from within the plurality of suggested search items by at least one decrement amount, and the increment amount is greater than the at least one decrement amount.

19. A non-transitory computer-readable storage medium having instructions stored thereon, which when read and executed by a computer including a browser, processor and local storage, cause the computer to perform steps comprising:
providing a suggestion curator;
storing, in the local storage in the computer, search history data including search item ratings;
receiving a search request entered by a user;
displaying, in response to the search request, at a user interface of the computer, a plurality of suggested search items, each suggested search item being associated with a rating from said search history data, and the plurality of suggested search items being displayed in an order according to their respective ratings,
receiving a selection by the user of a search item as a selected item;
in response to receiving the selection, categorizing the selected item as a new selection if the selected item has not previously been selected by the user and categorizing the selected item as a repeat selection if the selected item has previously been selected by the user and determining a browser session in which the selected item was previously selected;

determining a rating for the selected item when the selected item is categorized as a new selection and changing a rating for the selected item when the selected item is categorized as a repeat selection, wherein said changing is dependent upon the determined browser session in which the selected item was previously selected by the user, storing the rating for the selected item in the local storage in the computer to thereby update the order in which the plurality of suggested search items is displayed, according to the determined rating for the selected item, whereby the user is provided a display of the plurality of suggested search items in the order responsive to prior search and selection actions of the user.

* * * * *

UNITED STATES PATENT AND TRADEMARK OFFICE
CERTIFICATE OF CORRECTION

PATENT NO. : 10,896,224 B2
APPLICATION NO. : 15/820109
DATED : January 19, 2021
INVENTOR(S) : Vade et al.

It is certified that error appears in the above-identified patent and that said Letters Patent is hereby corrected as shown below:

In the Claims

In Column 15, Line 40, in Claim 10, delete "user';" and insert -- user; --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*